US005692284A

United States Patent [19]

Carnell

[11] Patent Number: 5,692,284

[45] Date of Patent: Dec. 2, 1997

[54] FREEZE PLUG INSTALLATION TOOL

[76] Inventor: Joe W. Carnell, Rte. 4 Box 124, Ozark, Ala. 36360

[21] Appl. No.: 444,903

[22] Filed: May 19, 1995

Related U.S. Application Data

[63] Continuation-in-part of Ser. No. 188,729, Jan. 31, 1994, abandoned.

[51] Int. Cl.[6] ........ B23P 19/04

[52] U.S. Cl. ........ 29/275; 269/234

[58] Field of Search ........ 29/254, 255, 275; 269/266, 234; 254/104, DIG. 6

[56] References Cited

U.S. PATENT DOCUMENTS

| | | |
|---|---|---|
| D. 282,814 | 3/1986 | Smith . |
| 2,424,090 | 7/1947 | Gordinier ........ 269/234 |
| 3,064,342 | 11/1962 | Wagner . |
| 4,229,870 | 10/1980 | Tate . |
| 4,286,368 | 9/1981 | Magana . |
| 4,341,004 | 7/1982 | Echols . |
| 4,459,730 | 7/1984 | Echols . |
| 4,514,890 | 5/1985 | Stewart . |
| 5,020,205 | 6/1991 | Wridt ........ 29/275 |

*Primary Examiner*—Robert C. Watson
*Attorney, Agent, or Firm*—Veal & Associates

[57] ABSTRACT

A tool for installation of freeze plugs in automotive internal combustion engines comprising an elongated hollow member having a wedge in cooperative relationship with a hammer which is slidably mounted in an end of the elongated member to move in a direction orthogonal to the direction of travel of the wedge. In one embodiment, the sliding hammer is itself wedge-shaped and is cooperatively aligned with the wedge. In others, the wedge impacts a ball which in turn impacts the hammer. A driving rod extends through the end of the elongated member such that an impact force applied to the end of the driving rod is transmitted to the wedge, then through the wedge to the hammer. The hammer impacts a driving cap which imparts force to a freeze plug, driving it into position in an aperture in the engine block.

5 Claims, 7 Drawing Sheets

FIG. 5
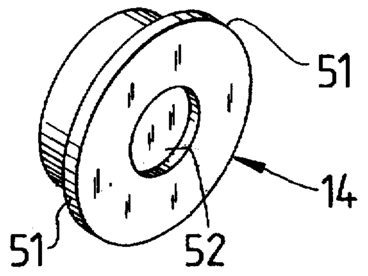
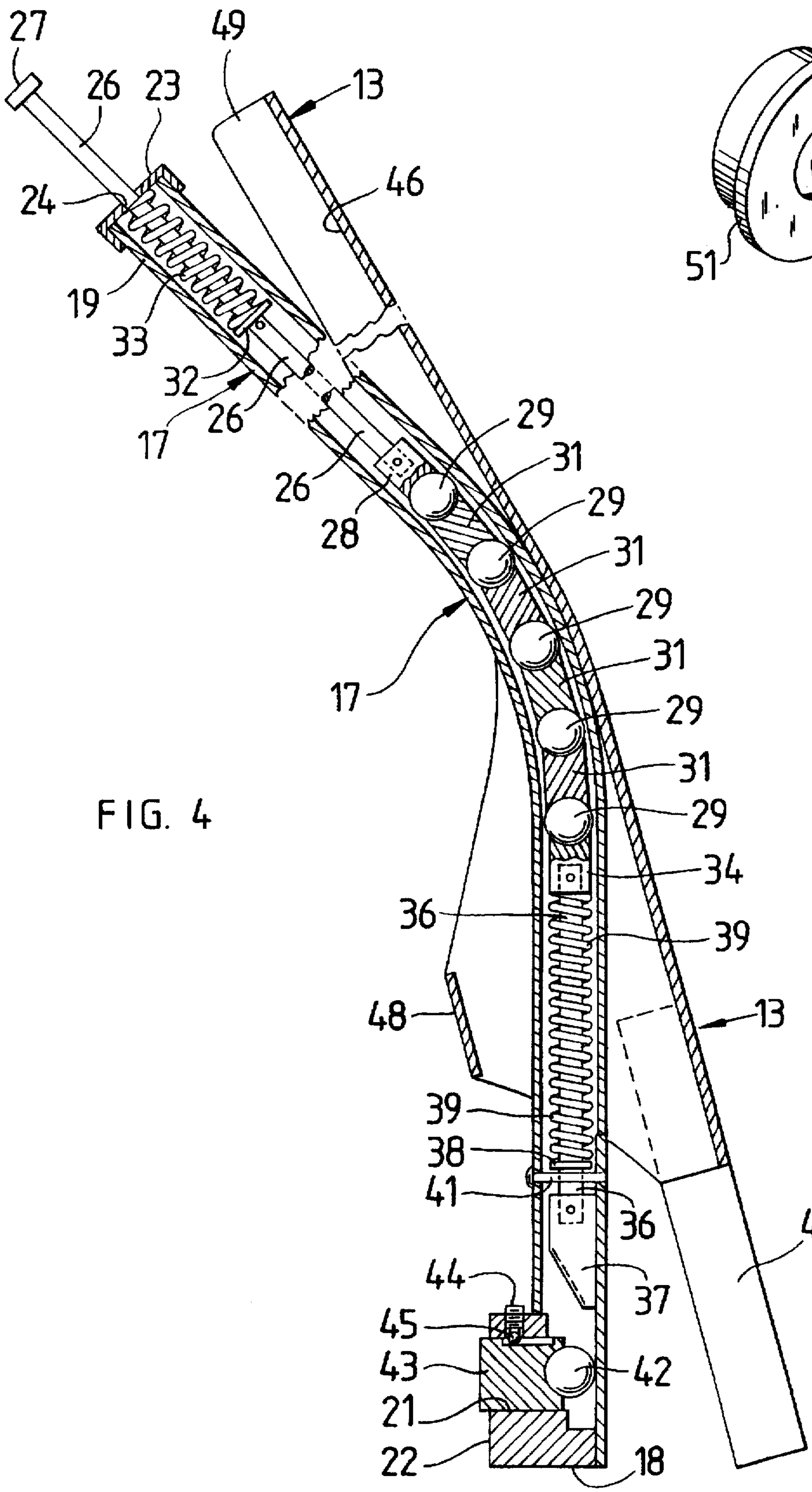
FIG. 4

FREEZE PLUG INSTALLATION TOOL

RELATED PATENTS

This application is a continuation-in-part under 35 U.S.C. § 120 of U.S. patent application Ser. No. 08/188,729 filed on Jan. 31, 1994 now abandoned.

FIELD OF THE INVENTION

The present invention relates to an apparatus for transmitting force. More particularly, the present invention relates to an apparatus for forcing plugs into apertures. Still more particularly, the invention relates to a tool for inserting freeze plugs into apertures in automotive engines, in areas of the engine with limited working clearance.

BACKGROUND OF THE INVENTION

Heads and blocks of automotive internal combustion engines have apertures in several different locations which must be sealed to permit operation of the engine. The apertures prevent damage to the engine block by allowing expansion of the fluid within the engine. The apertures are sealed with freeze plugs, which must on occasion be replaced. Freeze plugs are cup-shaped inserts which are forced into the apertures to form a seal. Insertion of a freeze plug can be time-consuming and expensive, depending on the location of the particular aperture to be sealed. In many cases, the engine head or other engine components must be removed from the vehicle to gain access to the aperture and have sufficient working clearance to properly insert the plug.

Although a number of tools have been developed for installing freeze plugs, they suffer from a variety of defects which preclude effective use. If a freeze plug is forced into an aperture at an angle, the freeze plug may be damaged or deformed, and the resulting seal will be defective. Some of the tools which have been designed for freeze plug installation provide access to the plug within a confined area, but provide for force to be directed to the plug at an angle. For example, U.S. Pat. No. 3,064,342 describes a tool comprising a combination of an elongated rod which is curved at one end and a boss. The boss has one side which is adapted to mate with the end of the elongated rod; the other side fits within the plug to be inserted. Force is applied to the freeze plug by hammering on the end of the rod. While the rod and boss provide access to the aperture, the greatest component of force is directed along the longitudinal axis of the rod, rather than directly into the aperture to be sealed. The freeze cap is accordingly forced into the aperture at an angle.

The tools described in U.S. Pat. No. 4,341,004 and U.S. Pat. No. 4,459,730 and in U.S. Pat. No. 4,229,870 are ineffective for the same reason. The tools comprise a disc having a circular land on one side for engaging a freeze plug and a depression or receptacle on the other side for engaging the end of a driver. Force applied to the opposing end of the driver is transmitted through the driver to the land, and consequently to the freeze plug. Although the tools are designed to provide access to apertures with a limited amount of clearance, they do not include any mechanism for changing the direction of the force. Therefore, force is applied directly into the aperture only when the driver extends substantially along the axis extending through the aperture. The greater the departure from this axis, the less effective the tool for seating the plug properly. As the amount of clearance between the aperture and any obstructions along the longitudinal axis extending through the aperture decreases, the departure of the driver from the optimal position necessarily increases.

The tool described in U.S. Pat. No. 4,514,890 includes a blunt installer head. The head is mounted on either the end or the side of a rod, depending on the amount of clearance available. When mounted on the end of a drive rod, the tool functions in the same manner and has the same deficiencies as the tools previously described. The installer head may also be mounted on the side of a rod, with an end of the rod being braced against the firewall. The plug is inserted by using the rod as a lever and applying force. In addition to forcing the plug into the aperture at an angle, the side-mounted configuration has the added disadvantage that the force required to seat the plug may result in damage to the area of the firewall against which the lever is braced.

U.S. Pat. No. 4,286,368 describes a tool which is superior to the previously described tools in that it is designed to seat the freeze plug by applying force in a direction directly into the aperture to be sealed. The tool has a hollow cylindrical body member which is to be braced between the engine block and an adjacent wall of the automobile. A hand-operated lever arm extends down into the body through a slot in the wall of the body. Movement of the lever arm actuates a link and connector within the body, which lie along the longitudinal axis extending from the aperture, to force the freeze plug into place. However, proper alignment of the tool requires sufficient clearance to place the cylindrical body member along the axis extending from the aperture and accordingly limits the locations on the engine block where use of the tool is feasible.

SUMMARY OF THE PRESENT INVENTION

With the foregoing in mind, the principal object of the present invention is to provide a tool which is capable of inserting freeze plugs into apertures located in areas of an engine with minimal working clearance.

Another object of the invention is to provide a tool which directs force against the freeze plug directly along a longitudinal axis extending into the aperture to be sealed, thereby preventing damage to the freeze plug and providing a tight seal between the freeze plug and the aperture.

Yet another object of the present invention is to provide a tool which changes the direction of an impact force imparted to the tool from a direction other than along the axis extending directly into the aperture to be sealed to a direction along that axis.

These and other objects of the invention are accomplished through the use of an elongated hollow member which houses means for transferring an impact force to a hammer which in turn transmits force to a driving cap and freeze plug. The first embodiment uses an elongated, curved, hollow member having a wedge and ball assembly in cooperative relationship with a sliding hammer at one end and a row of rigid spherical members separated by ball spacers within the elongated member. A driving rod extends from the row of spherical members through the end of the elongated member such that an impact force applied to the end of the driving rod is transmitted along the row of spherical members to the wedge and ball, and from the ball to the hammer, which protrudes through the side of the elongated member. The hammer impacts a disc-shaped driving cap which fits within the freeze plug and distributes the force over the surface of the plug. A forked handle holds the elongated member in proper position by providing leverage between the engine block and firewall.

In a second embodiment, the curve in the elongated hollow member is eliminated. The spherical members and ball spacers are likewise eliminated. The driving rod is connected directly to the wedge.

Alternatively, these and other objects of the invention are also accomplished through the use of a third embodiment of the present invention. This embodiment uses an elongated, hollow member having a driving wedge adjacent to a sliding hammer at one end and a driving rod within the elongated member. The driving wedge has a wedge-shaped end in a cooperative relationship with a wedge-shaped end of the hammer. The driving rod extends from the driving wedge through the end of the elongated member such that an impact force applied to the end of the driving rod is transmitted to the driving wedge, and from the driving wedge to the hammer, which protrudes through the side of the elongated member. The hammer is affixed to a disc-shaped driving cap by a threaded member.

BRIEF DESCRIPTION OF THE DRAWINGS

The foregoing objects and advantages of the present invention for an apparatus for installing freeze plugs into automotive internal combustion engines will be more readily understood by one skilled in the art by referring to the following detailed description of a preferred embodiment and to the accompanying drawings which form a part of this disclosure, and wherein:

FIG. 4 is a sectional view taken along line 4—4 of FIG. 2.

FIG. 5 is a perspective view of the driving cap.

DETAILED DESCRIPTION OF THE PREFERRED EMBODIMENT

Figure 1:
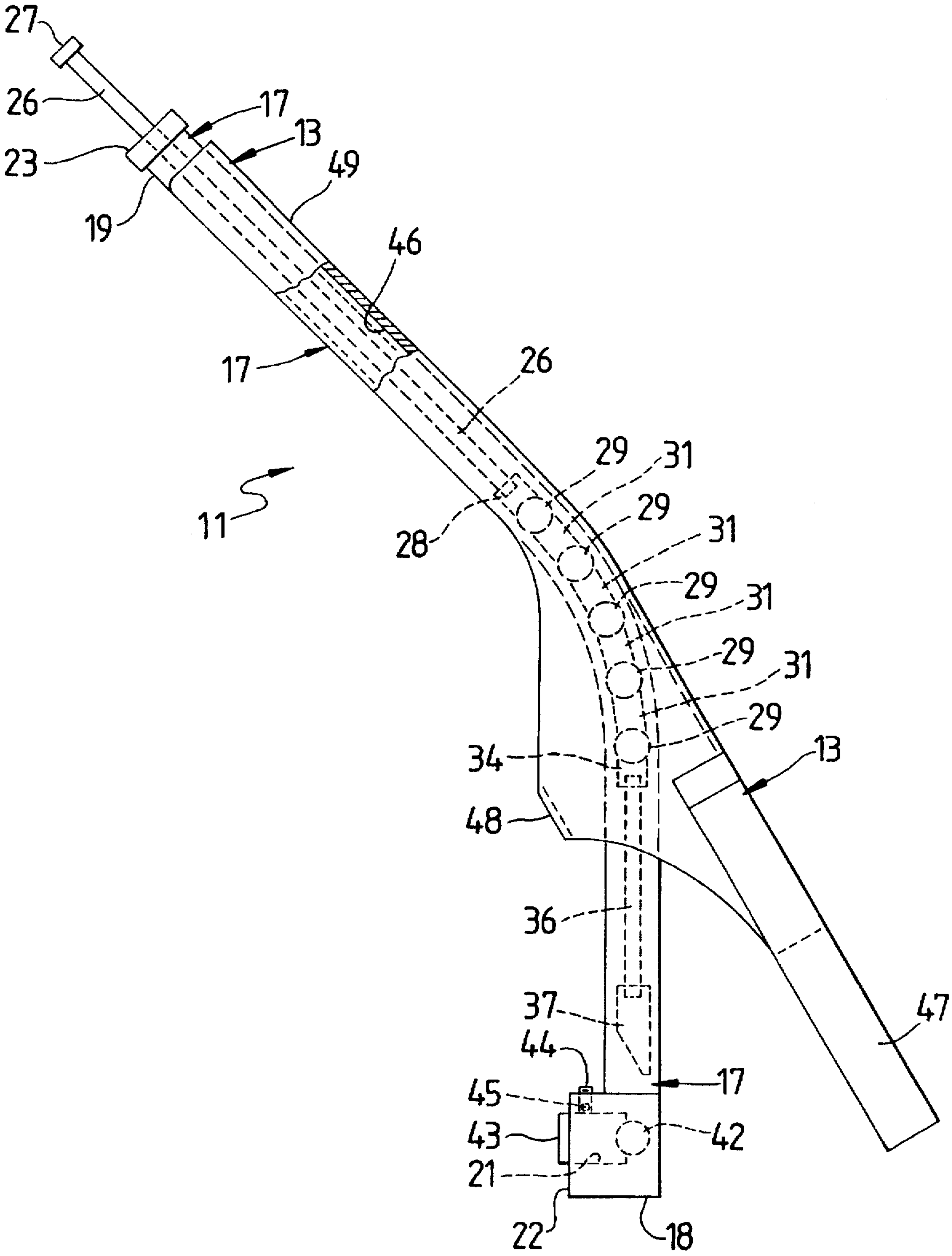
FIG. 1 is a side elevational view of the assembled tool.
Figure 2:
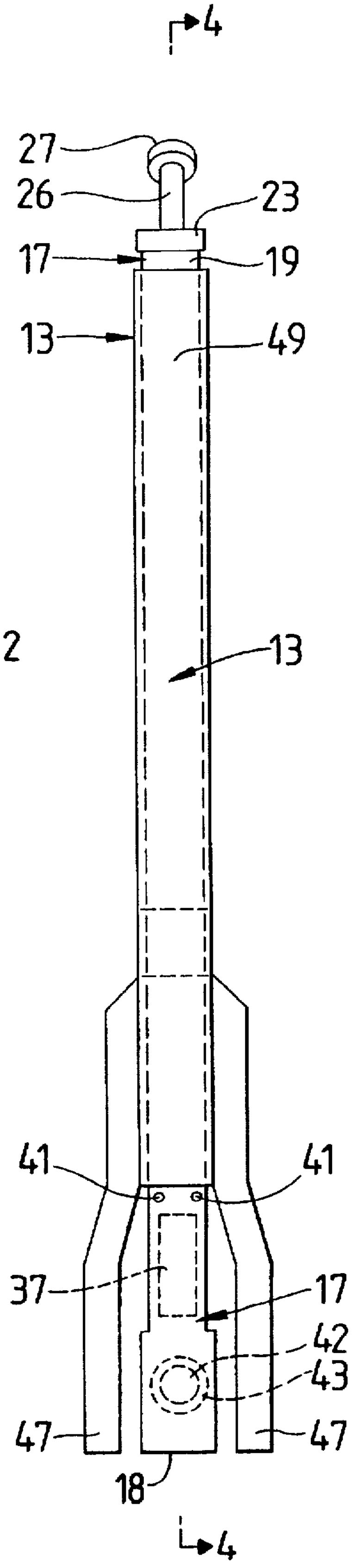
FIG. 2 is a front elevational view thereof.
Figure 6:
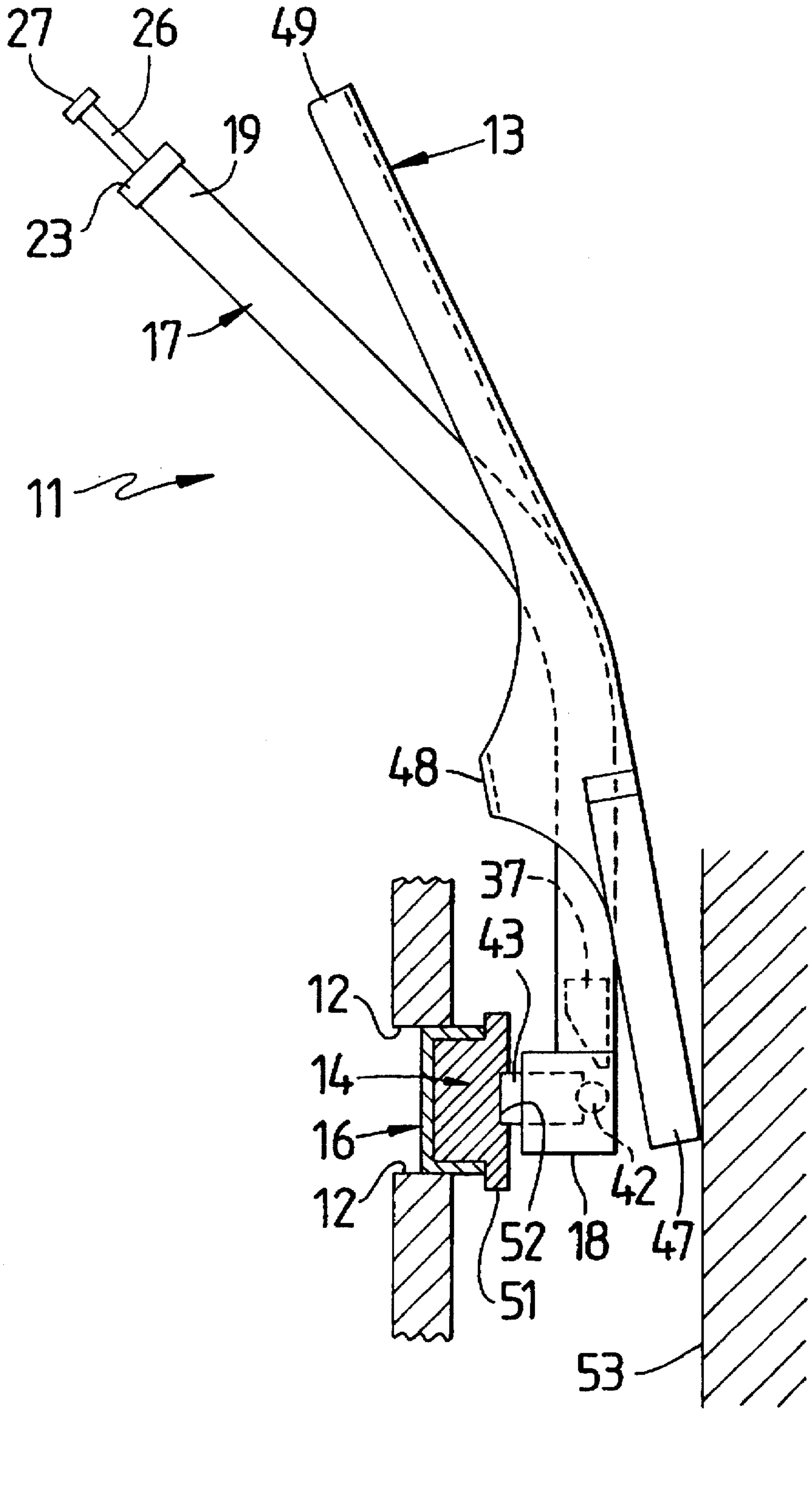
FIG. 6 illustrates use of the present invention to install a freeze plug into an engine block aperture with limited working clearance.

As best shown in FIG. 1 and FIG. 6, the present invention utilizes a force transferring means 11 which is held by a handle 13 in proper alignment with an aperture 12 to be sealed. The force transferring means 11 exerts force against a disc-shaped driving cap 14 which has been inserted into a freeze plug 16, thereby seating the freeze plug 16 securely within the aperture 12. Because of its configuration, the present invention enables proper installation of freeze plugs in areas of the engine block with less than two inches of working clearance along the axis extending directly out of the aperture.

The force transferring means 11 (FIGS. 1,4) comprises an elongated, curved, hollow body 17 having a plug-seating end 18 and a driving end 19. The plug-seating end 18 is L-shaped, and has an aperture 21 in its side wall 22. The driving end terminates in an end cap 23, which has an aperture 24 in its center. A driving rod 26 extends from inside the body 17 through the aperture 24 in the end cap 23. On the end of the driving rod 26 external to the body 17 is an impact surface 27. A cap 28 is rigidly affixed to the opposite end of the driving rod 26 inside of the body 17. The end of the cap 28 has a semi-spherical depression for receiving a spherical force transferring member 29. The cap 28 is adjacent a row of spherical force transferring members 29 separated by spacers 31 and confined within the body 17. A spring retainer 32 is rigidly affixed to the driving rod 26 at a location within the body 17 and proximal to the end cap 23. A spring 33 is positioned coaxially around the driving rod 26 between the end cap 23 and the spring retainer 32, and biases the cap 28 against the end of the row of spherical force transferring members 29. The opposite end of the row of spherical force transferring members 29 rests against a second cap 34. The second cap 34 also has a semi-spherical depression for receiving a spherical force transferring member 29. The second cap 34 is mounted on a second driving rod 36. A wedge 37 is affixed to the second driving rod 36 at the end opposite the second cap 34. A second spring retainer 38 is slidably mounted on the second driving rod 36 between the second cap 34 and the wedge 37. A second spring 39 is positioned coaxially around the second driving rod between the second cap 34 and the spring retainer 38. A spring stop 41 is rigidly mounted to the internal wall of the body 17 between the wedge 37 and the spring retainer 38. A ball 42 is positioned within the plug-seating end 18 of the body 17 adjacent the wedge 37. A hammer 43 is adjacent the ball 42 and extends through the aperture 21 in the side wall 22. The hammer 43 has a semi-spherical depression in the end adjacent the ball for receiving the ball 42. The hammer 43 further has an indentation along one side. The wall of the plug-seating end 18 adjacent to the indentation in the hammer 43 has a bore therethrough. A set screw 44 threaded into the outer end of the bore holds a ball bearing 45 in position so that a portion of the ball bearing protrudes from the inner end of the bore and into the indentation in the hammer 43, thereby preventing the hammer from disengaging from the body 17 through the aperture 21.

Figure 3:
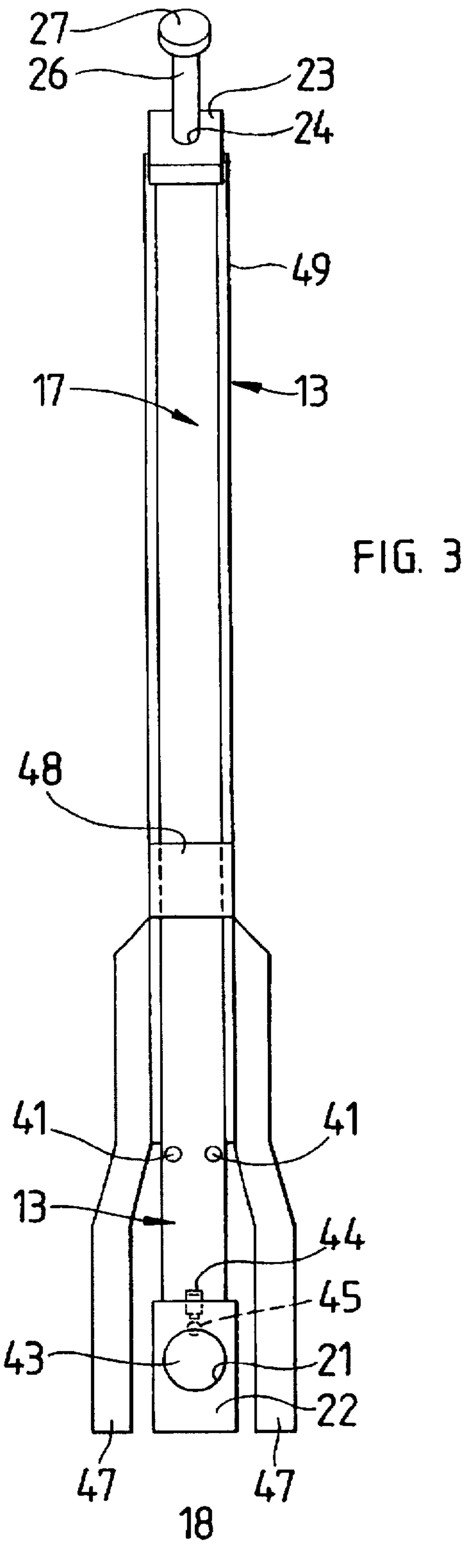
FIG. 3 is a rear elevational view thereof.

The handle 13 (FIG. 3 and FIG. 4) is elongated and defines a lengthwise channel 46. It has a forked end 47, and a raised bridge 48 located next to the forked end which extends across the handle from one side of the channel 46 to the other. The handle has a gripping end 49 opposite the forked end 47. In the preferred embodiment the handle 13 is curved, however, a straight handle could also be used.

The driving cap 14 (FIG. 5) is disc-shaped, with an enlarged rim 51 around its outer periphery on one side. A depression 52 is located in the center of the same side of the cap 14. The opposite side of the driving cap 14 is of a diameter to fit within a freeze plug. The driving cap is magnetic, to hold the freeze plug in place during installation.

The invention is used by assembling the force transferring means 11 with the handle 13 so that the body 17 rests within the channel 46 and extends under the bridge 48 with the plug-seating end 18 positioned between the prongs of the forked end 47. A freeze plug is placed on the driving cap 14 on the side opposite the enlarged rim 51 and the depression 52. The freeze plug and driving cap are placed in proper alignment with the aperture 12. The hammer 43 in the plug-seating end 18 of the body is aligned with the depression 52 in the driving cap 14. The gripping end 49 of the handle 13 is forced firmly toward the driving end 19 of the force transferring means 11 so that the forked end 47 of the handle 13 is forced away from the plug-seating end 18 of the force transferring means 11 and against a wall 53 of the automobile, thereby holding the tool in proper position. An impact force is applied against the impact surface 27 of the driving rod 26 with a hammer or mallet. The driving rod 26 in turn impacts on the end of the row of spherical force transmitting members 29. The force is incrementally deflected around the curve in the body 17 and into the second driving rod 36, pushing the wedge 37 toward the ball 42. The wedge 37 and ball 42 cooperate to redirect the line of force toward the hammer 43. The hammer is forced through the aperture 21, and impacts the driving cap 14, in a direction normal to the aperture, thereby forcing the freeze plug 16 into the aperture 12. The spring 39, spring retainer 38 and spring stop 41 operate to return the internal components to their original positions.

Figure 7:
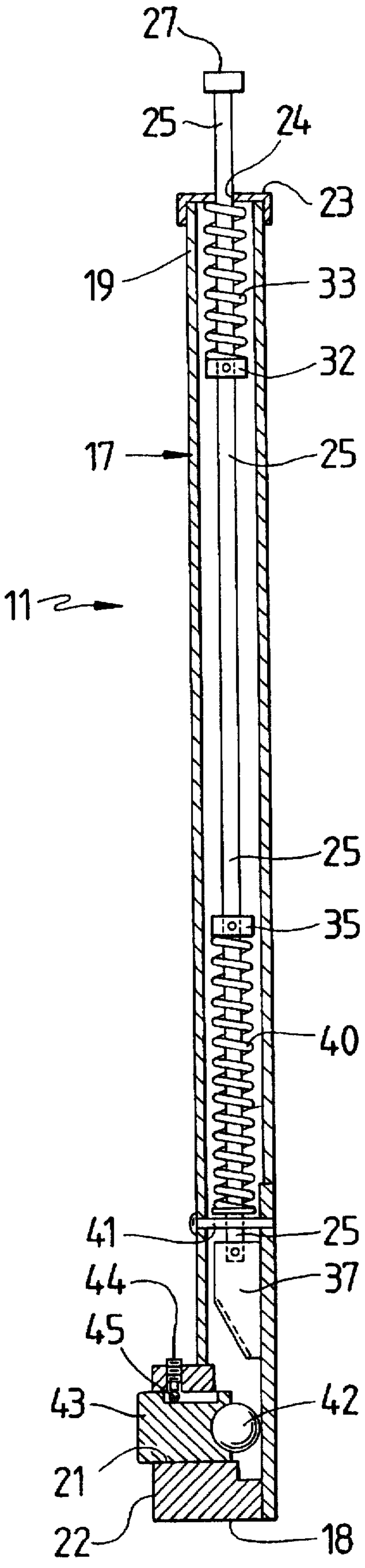
FIG. 7 is a sectional view of a straight embodiment of the present invention.
Figure 8:
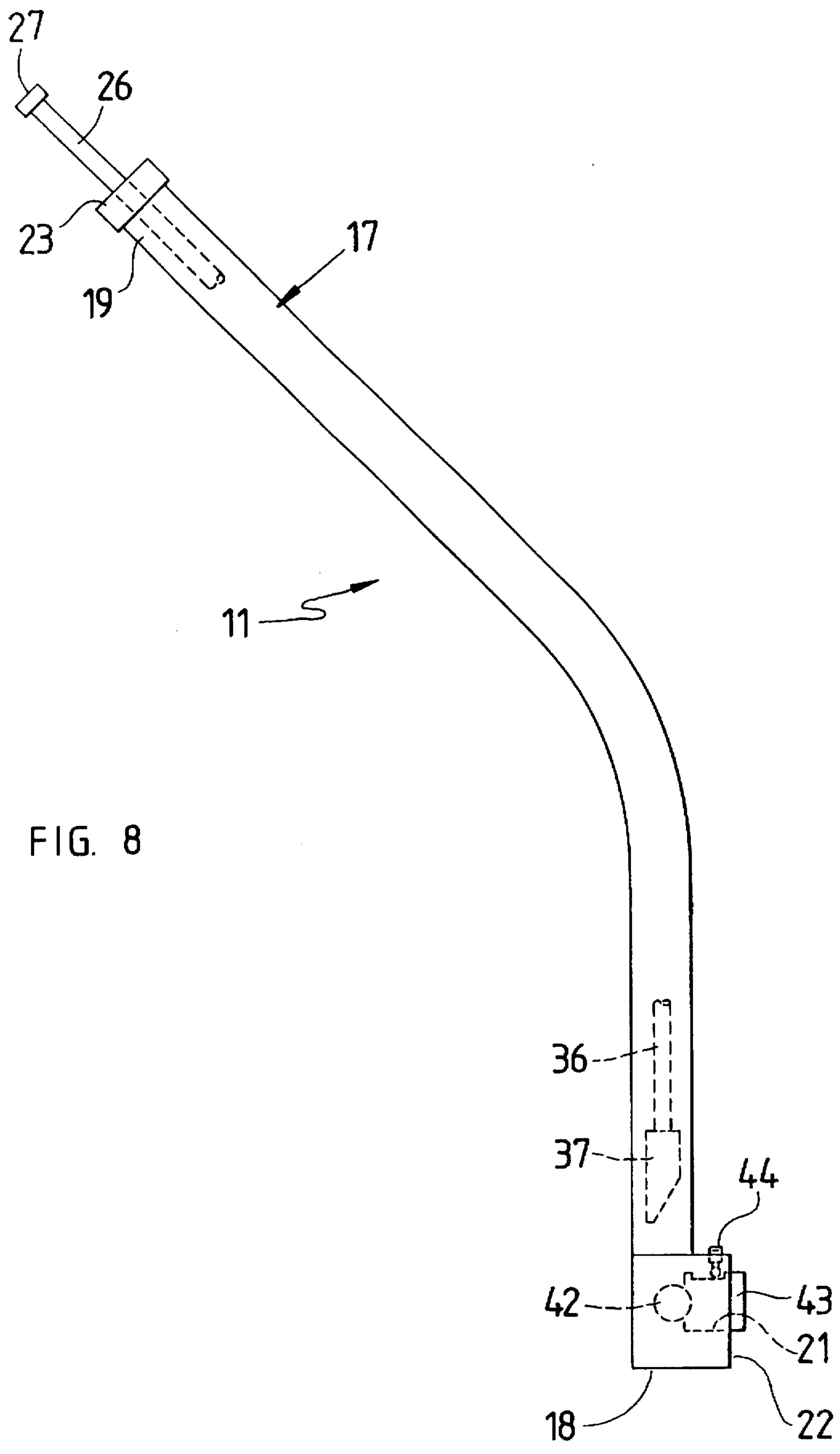
FIG. 8 is a side elevational view of the present invention illustrating an alternate position for the wedge, ball and hammer.

FIG. 7 shows an alternate embodiment of the present invention wherein the force-transferring means 11 is straight, rather than curved. This alternate embodiment uses a single elongated driving rod 25. The driving rod 25 extends from outside the body 17, through the aperture 24 in the end cap 23. On the end of the driving rod 25 external to the body 17 is an impact surface 27. The end of the driving rod 25 which is inside the body 17 is rigidly affixed to the wedge 37. A first spring retainer 32 is rigidly affixed to the driving rod 25 at a location within the body 17 and proximal to end cap 23. A second spring retainer 35 is rigidly affixed to the driving rod 25 at a location within the body 17 and proximal to the wedge 37. A spring 33 is positioned coaxially around the driving rod 25 between the end cap 23 and the first spring retainer 32. A second spring 40 is positioned coaxially around the driving rod 25 between the wedge 37 and the second spring retainer 35.

Figure 9:
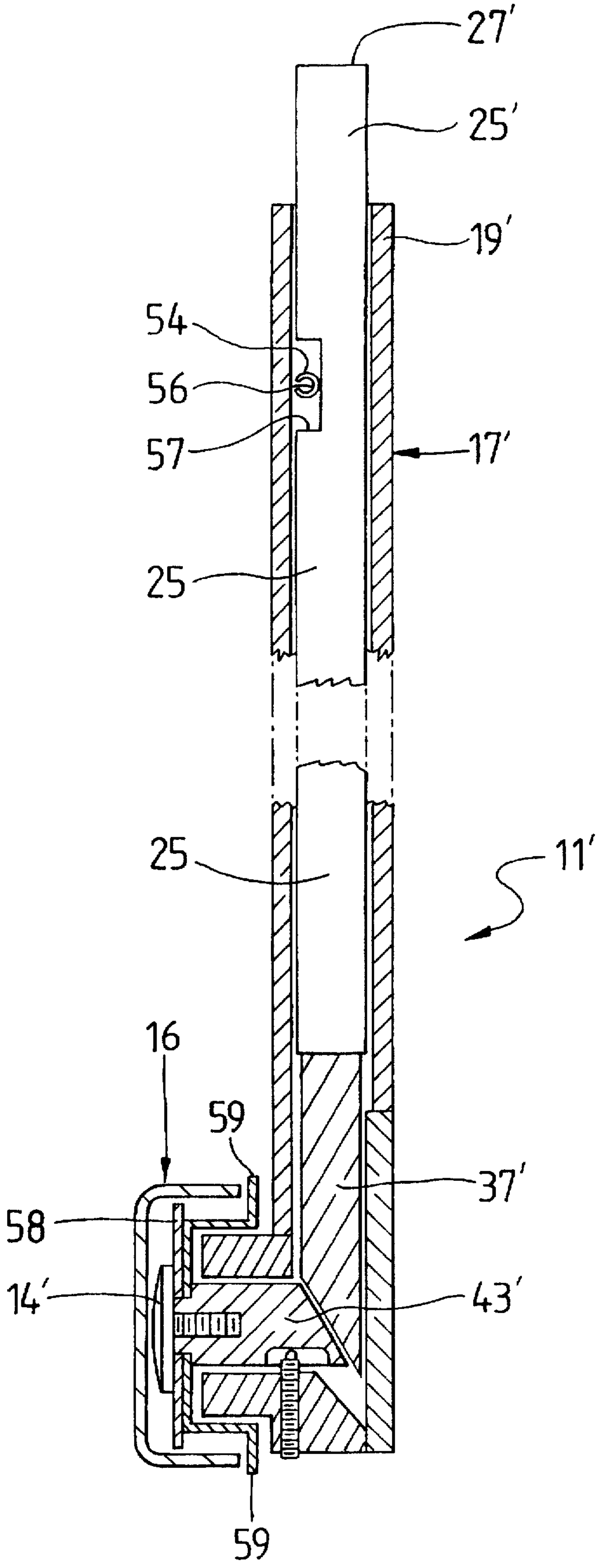
FIG. 9 is a sectional view of an alternate straight embodiment of the present invention.

FIG. 9 shows another embodiment of the present invention wherein the force-transferring means 11', is straight. This alternate embodiment uses an elongated driving rod 25', which extends through the aperture on the driving end 19', of the body 17', and terminates with an impact surface 27'. The driving end of 19' of the body 17' has a pair of coaxial apertures 54 defined therethrough for receiving the roll pin 56. The driving rod 25' has a notch 57 positioned such that the roll pin 56 extending through the apertures 54 in the body 17', engages the driving rod 25', at the notch 57, and thereby limits the movement of the driving rod 25' relative to the body 17'. The end of the driving rod 25' which is inside the body 17', is adjacent to a driving wedge 37'. The driving wedge is adjacent to a hammer 43'. The hammer 43' is aligned perpendicular to the driving wedge 37', and has a first end rigidly affixed to a driving cap 14', which may be a threaded member and a second end adjacent to the driving wedge 37'. The second end of the hammer 43' adjacent to the driving wedge 37', has a wedge shape and is cooperatively aligned with the driving wedge 37' such that forcing the driving wedge 37', against the second end of the hammer 43', causes the hammer 43', to move in a direction substantially perpendicular to the direction of force of the driving wedge 37'. To use the apparatus, an impact force is applied to the impact surface 27', of the driving rod 25'. The driving rod 25' impacts the driving wedge 37', which, in turn, impacts the wedge-shaped end of the hammer 43'. The hammer 43' and the rigidly affixed driving cap 14', are driven perpendicular from the driving wedge 37', driving the freeze plug 16' into the aperture 12. Optional structures include a washer 58 connected to the hammer by the driving cap 14'. The washer 58 centers the driving cap 14' within the freeze plug 16. Another optional structure is a stop 59 rigidly affixed to the hammer 43', overlying the same and radially extending therefrom, which serves to stop movement of the driving cap 14', when the stop 59 comes in contact with the engine block, thus preventing the freeze plug 16 from being driven too far into the aperture 12.

While I have shown my invention in several forms, it will be obvious to those skilled in the art that it is not so limited but is susceptible of various changes and modifications without departing from the spirit thereof.

Having set forth the nature of the invention, what is claimed is:

1. An apparatus for installing a freeze plug into an aperture in an automotive internal combustion engine, said apparatus having a longitudinal axis extending therethrough, comprising:

(a) an elongated, hollow body defining a passage therein, and having a driving end and a plug-seating end, said driving end having an aperture therethrough, and said plug-seating end having a side wall with an aperture therethrough;

(b) means, encased within body, for substantially changing the direction of a force externally applied in a direction along the longitudinal axis of said body to a direction substantially normal to said aperture in said side wall;

(c) a hammer, slidably mounted within an extending through said aperture in said side wall of said plug-seating end of said body;

(d) means, located intermediate said freeze plug and said plug seating end of said body for transferring said force to said freezing plug; and (e) means, located intermediate said freeze plug and said plug seating end of said body for stopping the movement of said freeze plug into said aperture when said movement-stopping means comes in contact with said engine.

2. An apparatus for installing a freeze plug into an aperture in an automotive internal combustion engine, said apparatus having a longitudinal axis extending therethrough, comprising:

(a) an elongated, hollow body defining a passage therein, and having a driving end and a plug-seating end, said driving end having an aperture therethrough, and said plug-seating end having a side wall with an aperture therethrough;

(b) means, encased within said body, for substantially changing the direction of a force externally applied in a direction along the longitudinal axis of said body to a direction substantially normal to said aperture in said side wall;

(c) a hammer, slidably mounted within and extending through said aperture in said side wall of said plug-seating end of said body;

(d) means, located intermediate said freeze plug and said plug seating end of said body for transferring said force to said force to said freeze plug; and (e) means, located intermediate said freeze plug and said plug seating end of said body for centering said force transferring means within said freeze plug.

3. An apparatus as defined in claim 2, further comprising a driving rod, extending from outside of said body, through said aperture in said driving end of said body and into said passage.

4. An apparatus as defined in claim 3, wherein said direction changing means comprises a driving wedge adjacent said driving rod within said passage, said driving wedge positioned such that force applied to said driving wedge through said driving rod urges said hammer in a direction substantially perpendicular to said longitudinal axis of said body.

5. An apparatus as defined in claim 4, wherein said hammer has a wedge-shaped end adjacent and cooperatively aligned with said driving wedge.

* * * * *

UNITED STATES PATENT AND TRADEMARK OFFICE

CERTIFICATE OF CORRECTION

PATENT NO. : 5,692,284
DATED : Dec. 2, 1997
INVENTOR(S) : Carnell

It is certified that error appears in the above-indentified patent and that said Letters Patent is hereby corrected as shown below:

In Claim 1, line 10, after "means, encased within" insert --said--.

In Claim 1, line 15, replace"an" with --and--.

Signed and Sealed this

Twelfth Day of May, 1998

Attest:

BRUCE LEHMAN

Attesting Officer

*Commissioner of Patents and Trademarks*